US010981264B2

(12) United States Patent
Koski et al.

(10) Patent No.: US 10,981,264 B2
(45) Date of Patent: Apr. 20, 2021

(54) HYDRAULIC POWER TOOL

(71) Applicant: Milwaukee Electric Tool Corporation, Brookfield, WI (US)

(72) Inventors: Jonathan Koski, Brookfield, WI (US); Troy Marks, Brookfield, WI (US); Eric Norquist, Brookfield, WI (US); James Ballard, Brookfield, WI (US); Kris Kanack, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 113 days.

(21) Appl. No.: 15/710,976

(22) Filed: Sep. 21, 2017

(65) Prior Publication Data

US 2018/0099388 A1    Apr. 12, 2018

Related U.S. Application Data

(60) Provisional application No. 62/405,582, filed on Oct. 7, 2016.

(51) Int. Cl.
*B25B 27/10* (2006.01)
*B25F 1/02* (2006.01)
(Continued)

(52) U.S. Cl.
CPC ............ *B25B 27/10* (2013.01); *B21D 39/048* (2013.01); *B23P 19/04* (2013.01); *B25F 1/02* (2013.01); *B25F 3/00* (2013.01); *H01R 43/048* (2013.01); *H01R 43/0428* (2013.01); *B26D 2001/0066* (2013.01)

(58) Field of Classification Search
CPC ......... B25B 28/00; B25B 27/10; H01R 43/05; H01R 43/0427; H01R 43/0428; F15B 7/001; F15B 15/204; B21D 39/048; B21D 37/10; B23Q 3/183; B23Q 3/186;
(Continued)

(56) References Cited

U.S. PATENT DOCUMENTS 4,174,646 A * 11/1979 Kotler .................... B25B 23/16
                                                                30/101
5,119,665 A *  6/1992 Stafford .................. B25B 7/02
                                                                72/409.13
(Continued)

FOREIGN PATENT DOCUMENTS

EP          1122031 A1    8/2001
EP          2158650 B1   10/2016

OTHER PUBLICATIONS

Form PCT/ISA/206, Invitation to Pay Additional Fees and, Where Applicable, Protest Fee dated Jan. 16, 2018.
(Continued)

*Primary Examiner* — Shelley M Self
*Assistant Examiner* — Teresa A Guthrie
(74) *Attorney, Agent, or Firm* — Quarles & Brady LLP

(57) ABSTRACT

A working head for a hydraulic power tool. The working head includes a head frame and a first moveable die head configured to move along the working head frame. The first moveable die head is configured to receive a first moveable die comprising a first body length and a second die head is adapted to receive a second die comprising a second body length. At least one of the moveable die or the stationary die comprises an elongated die.

13 Claims, 6 Drawing Sheets

(51) Int. Cl.
  *H01R 43/042* (2006.01)
  *B25F 3/00* (2006.01)
  *B23P 19/04* (2006.01)
  *B21D 39/04* (2006.01)
  *H01R 43/048* (2006.01)
  *B26D 1/00* (2006.01)

(58) Field of Classification Search
  CPC ............. Y10T 403/16; Y10T 403/1616; Y10T 403/1624; Y10T 403/20; Y10T 403/10
  USPC ........ 72/412, 416, 453, 481.1, 482.3, 482.5, 72/338
  See application file for complete search history.

(56) References Cited

U.S. PATENT DOCUMENTS

| | | | |
|---|---|---|---|
| D356,478 S | 3/1995 | Heskey et al. | |
| 5,421,186 A * | 6/1995 | Lefavour | H01R 43/042 72/409.01 |
| D374,805 S | 10/1996 | Moffatt et al. | |
| D383,046 S | 9/1997 | Moffatt et al. | |
| D408,242 S | 4/1999 | Yamamoto | |
| 5,979,215 A | 11/1999 | Lefavour et al. | |
| 6,227,030 B1 * | 5/2001 | Lefavour | H01R 43/0428 29/751 |
| 6,230,542 B1 | 5/2001 | Frenken | |
| 6,276,186 B1 | 8/2001 | Frenken | |
| 6,401,515 B2 | 6/2002 | Frenken | |
| 6,446,482 B1 | 9/2002 | Heskey et al. | |
| 6,532,790 B2 * | 3/2003 | Frenken | B23D 23/00 72/409.16 |
| 6,666,064 B2 | 12/2003 | Lefavour et al. | |
| 6,718,870 B1 * | 4/2004 | Frenken | B25B 27/10 100/102 |
| 6,792,789 B1 | 9/2004 | Jackson et al. | |
| 6,986,274 B2 | 1/2006 | Lefavour et al. | |
| 7,066,003 B2 | 6/2006 | Lefavour et al. | |
| 7,254,982 B2 | 8/2007 | Frenken | |
| 7,412,868 B2 | 8/2008 | Frenken | |
| 7,421,877 B2 | 9/2008 | Frenken | |
| 7,788,962 B2 | 9/2010 | Chiasson et al. | |
| 7,841,223 B2 | 11/2010 | Rollins et al. | |
| 7,926,321 B2 | 4/2011 | Rollins et al. | |
| 8,001,822 B2 | 8/2011 | Chadbourne | |
| 8,276,430 B2 | 10/2012 | Barezzani et al. | |
| 8,839,653 B2 | 9/2014 | Roman, Jr. | |
| 8,844,436 B2 | 9/2014 | Frenken | |
| 8,935,948 B1 | 1/2015 | Gregory | |
| 9,774,159 B2 | 9/2017 | Hamm et al. | |
| 10,054,139 B2 | 8/2018 | Craciun et al. | |
| 10,109,971 B2 | 10/2018 | Lefavour et al. | |
| 2008/0022749 A1 * | 1/2008 | Chadbourne | H01R 43/058 72/412 |
| 2013/0264085 A1 | 10/2013 | Ciotti | |
| 2014/0260503 A1 * | 9/2014 | Therrien | B21D 37/10 72/372 |
| 2014/0260505 A1 | 9/2014 | Bowles et al. | |
| 2016/0268068 A1 | 9/2016 | Chiasson et al. | |
| 2016/0276117 A1 | 9/2016 | Yajima | |
| 2017/0063014 A1 * | 3/2017 | Rzasa | B25F 5/021 |
| 2017/0256901 A1 * | 9/2017 | Boutin | H01R 43/0427 |

OTHER PUBLICATIONS

English Translation of Abstract of European Patent Application No. 1122031 dated Feb. 20, 2018.

* cited by examiner

HYDRAULIC POWER TOOL

CROSS REFERENCE TO RELATED APPLICATION

The present application claims priority to U.S. Provisional patent application Ser. No. 62/405,582, filed on Oct. 7, 2017, and entitled "Hydraulic Power Tool," which is herein incorporated by reference as if fully set forth in this description.

FIELD

The present disclosure relates generally to power tools. More particularly, the present disclosure relates to a handheld power tool that utilizes at least one extended die that provides a shorter ram stroke and therefore enables a faster duty cycle between tool activation, such as either crimping or cutting. This hand held power tool may be a crimping power tool, a cutting power tool, or other type of tool that utilizes a die set. The present disclosure also relates to connector alignment features that allow a power tool user to align a working head (i.e., compression or cutting head) with a targeted location of a work piece, such as an electrical connector, electrical wire, or cable.

BACKGROUND

Unless otherwise indicated herein, material described in this section are not prior art to the claims and are not admitted to be prior art by inclusion in this section.

Hydraulic crimpers and cutters are different types of hydraulic power tools for performing work (e.g., crimping or cutting) on a work piece. In such tools, a hydraulic tool comprising a hydraulic pump is utilized for pressurizing hydraulic fluid and transferring it to a cylinder in the tool. This cylinder causes an extendable piston or ram assembly to be displaced towards a working head, such as a crimping head or a cutting head. The piston exerts a force on the working head of the power tool, which may typically include opposed crimp dies with certain crimping features. The force exerted by the piston may be used for closing the crimp dies to perform a crimp or perform a cut on a work piece at a desired crimp or cut location.

Certain hydraulic tools and associated working heads are known. For example, one known hydraulic crimping tool utilizes a biased open-single pivot crimping head. Such a biased open crimping tool head may be spring biased such that the jaws of the crimping tool pivot about a single pivoting point axis. Spring biased jaws remain open prior to initiation of the crimp. There are certain perceived disadvantages of utilizing such a biased open-single pivot crimping head. As just one disadvantage, because of the biased open nature of the jaws of such a crimping head, proper alignment of the crimping jaws with a desired crimp location can be difficult since the crimping head is biased open. Oftentimes, in an attempt to accomplish a successful crimp at a desired crimp location, a user of such a biased open crimping device may "jog" (i.e., quickly starting and stopping) the device to approach a closed jaw position just prior to the actual crimping operation in order to achieve a desired crimp location on the connector. Such a process may result in a crimp that is performed at an undesired location on the connector. In addition, such a process may also add additional time and touch labor as some connectors (especially high voltage/high current application) may utilize large aluminum to copper splicing connectors or aluminum to aluminum splicing connectors (such as on the order of over 5 inches in length) and may require repeated crimps.

SUMMARY

According to an exemplary arrangement, a working head for a hydraulic power tool comprises a head frame, a first moveable die head configured to move along the working head frame, the first moveable die head configured to receive a first moveable die comprising a first body length; and a second die head adapted to receive a second die comprising a second body length. At least one of the first moveable die or the second die comprises an elongated die.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
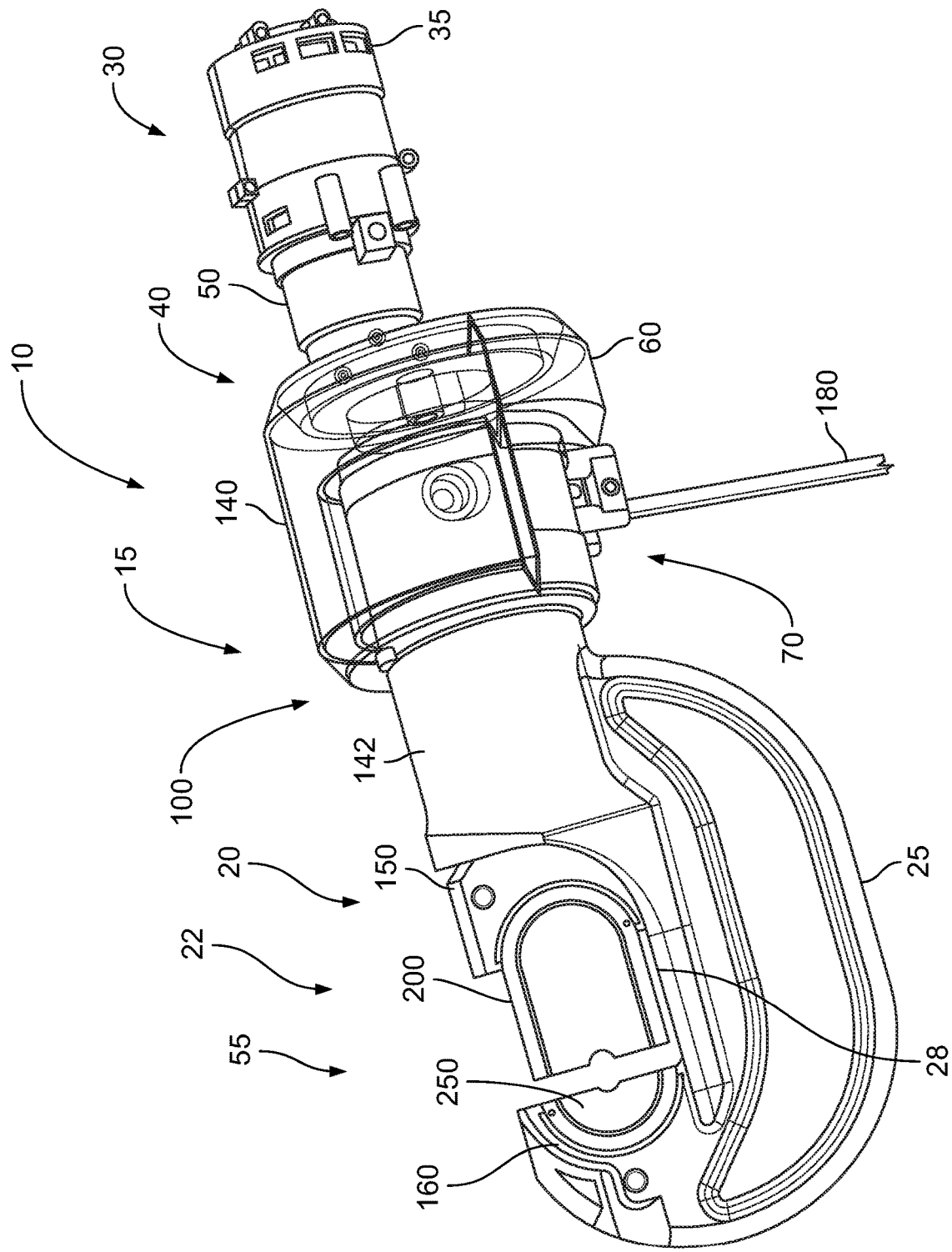
FIG. 1 illustrates a perspective view of an exemplary hydraulic tool.

FIG. 1 illustrates a perspective view of a hydraulic tool 10 incorporating features of the present disclosure. For example, the hydraulic tool 10 comprises a working head 22 that utilizes a die set 55. In one arrangement, the working head 22 comprises a crimping head that utilizes the die set 55 comprising a moveable crimp die 200 and a stationary crimp die 250. Preferably, as will be described in greater detail herein, the moveable crimp die 200 and the stationary crimp die 250 comprise different geometrical shapes from one another. In such a preferred arrangement, either the movable die 200 or the stationary die 250 may comprise an extended die. In an alternative preferred arrangement, both the moveable die 200 and the stationary die 250 comprise an extended die. In such a situation, the move die 200 and the stationary die 200 may be symmetrical dies or, alternatively, non-symmetrical dies. In yet another arrangement, where an extended stationary die is used, this extended stationary die may comprise one or more die components. Similarly, where an extended moveable die is used, this extended moveable die may comprise one or more die components.

Utilizing such a die set 55 reduces an amount of ram assembly travel that is required per crimp. As such, the disclosed die set 55 reduces cycle time, since the ram assembly and therefore the moveable crimp die 200 can be driven a shorter distance in order to achieve a desired crimp. When the working head 22 comprises a cutting head, the die set 55 may comprise a stationary cutting die and a moveable cutting die comprising different geometrical shapes as well.

In one arrangement, the working head 22 comprises one or more alignment features. Such alignment features may be used to enhance an ability of a user of the hydraulic tool 10 to achieve a desired crimp or desired cut at a specific crimp target location of a work piece, such as an electrical connector, wire or cable. Although the hydraulic tool 10 will be described with reference to the exemplary embodiment shown in the drawings, it should be understood that the hydraulic tool 10 and its various components can be embodied in alternate forms of embodiments. In addition, any suitable size, shape or type of elements or materials could be used.

In this illustrated arrangement, the hydraulic tool 10 comprises a battery operated hydraulic crimping tool. This battery operated hydraulic crimping tool may be a hand held crimping tool. However, in alternate embodiments, features of the present disclosure could be used in a suitable type of hydraulic tool or pneumatic tool, or tool having a movable ram. The tool 10 generally comprises a tool main section 15, a tool working end 20, and a tool transmission end 30.

The tool main section 15 generally comprises a cylinder 140, a ram assembly 100, a bladder 60, a hydraulic pump 40, a hydraulic fluid passage circuit 70, and a user activated release lever 180. The hydraulic fluid passage circuit 70 may comprise a plurality of fluid passages that provide fluid communication between a fluid reservoir or bladder 60 which provides fluid communication to and from the tool working end 20 by way of the ram assembly 100. The ram assembly 100 comprises a moveable ram assembly, one that is adapted to move forward or towards the working head 22 in order to commence a crimp of a crimping target, such as an electrical connector. The ram assembly 100 is also adapted to move backward, or retract away from the working head 22. The moveable die 200 is removably coupled to the ram assembly 100 and seated within the movable die head 150. The hydraulic tool 10 can be provided with a user activated control system including a user actuated human interface device, such as a user activated release switch, a start switch or trigger, and a release lever 180.

The hydraulic tool 10 further comprises a tool transmission end 30. The tool transmission end 30 of the hydraulic tool 10 comprises an electric motor 35 configured to drive the hydraulic pump 40 by way of a gear reducer 50. An output shaft of the motor 35 is connected to the pump 40 by way of a gear reduction or gearbox 50. Any suitable type of gear reduction assembly could be provided. For example, in one preferred arrangement, the gear reducer comprises a 10 to 1 gear reduction.

Although the presently illustrated hydraulic tool 10 may comprise a battery operated hydraulic tool, in an alternate embodiment, the tool main section 15 could be adapted to be connected to a remote hydraulic fluid supply by hydraulic hoses. In one preferred arrangement, the hydraulic tool 10 is configured as a self contained manually operated hydraulic crimping tool. In one alternative arrangement, the hydraulic tool 10 is configured as a self contained manually operated hydraulic cutting tool comprising a stationary cutting die and a moveable cutting die. The tool main section 15 may also comprise a pressure transducer.

Figure 2:
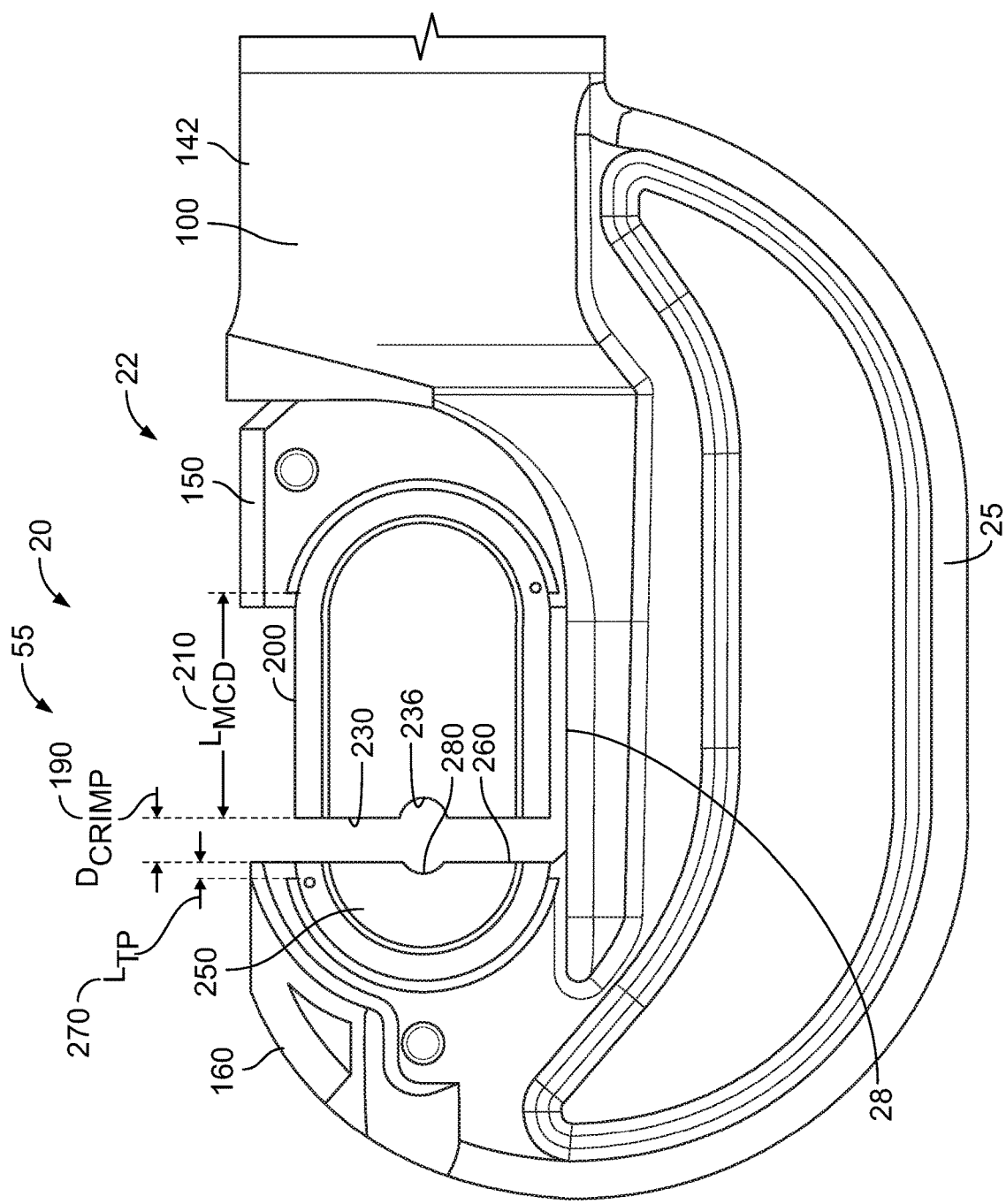
FIG. 2 illustrates a perspective view of the working head of the exemplary hydraulic tool illustrated in FIG. 1.

FIG. 2 illustrates a close up view of the crimping head 22 illustrated in FIG. 1. In this illustrated embodiment, the tool working end 20 comprises a moveable die head 150 that is operably coupled to the ram assembly 100 for moving forward during a crimping action and then being retracted, in an opposite direction. The moveable die head 150 is separated from the stationary or crimper die head 160 by a head frame 25. A generally flat guide surface 28 separates the moveable die head 150 from the stationary die head 160. For example, in this illustrated embodiment, the stationary die head 160 comprises a C-style head. The moveable die head 150 is axially moveable along the frame 25 of the C-style head by way of the ram assembly 100. The moveable die head 150 is adapted to receive one or more movable dies, such as the movable crimp die 200 or alternatively, a moveable cutting die. Similarly, the stationary die head 160 is adapted to receive one or more stationary dies, such as the stationary crimp die 250 or a stationary cutting die. Such stationary dies may or may not be removable from the stationary head 160.

Specifically, in this illustrated arrangement, the set of crimp dies 200, 250 may be selected so as to define a working distance, such as a crimping distance $D_{CRIMP}$ 190, when the ram assembly 100 is in the fully retracted position or home position (as illustrated in FIG. 2). The ram assembly retract position being a start position for the ram assembly. In one arrangement, the crimping distance $D_{CRIMP}$ 190 may be defined as a distance between a die face 260 of the stationary die 250 and a die face 230 of the moveable die 200.

In this illustrated arrangement, the stationary die 250 and the movable die 200 comprise crimp dies having different geometrical shapes. For example, in this illustrated arrangement, the moveable die 200 comprises a body length $L_{MCD}$ 210 that is different than a body length $L_{SCD}$ 270 of the stationary die 250. As such, in this illustrated arrangement, the length of the movable crimp die $L_{MCD}$ 210 is greater than the stationary crimp die length $L_{SCD}$ 270. However, as those of ordinary skill in the art will recognize, alternative die set arrangements and/or geometrical configurations and alternative body lengths may also be used.

One advantage of using such die sets having dissimilar body lengths $L_{MCD}$, $L_{SCD}$ is that for crimping connectors comprising a smaller diameter, a shorter ram stroke can be utilized to perform a crimp. For example, as illustrated in FIG. 2, a stroke required to crimp a connector equals the distance $D_{CRIMP}$ 190. As such, one advantage of utilizing the crimp set 55 illustrated in FIG. 2 is that the duty cycle between multiple crimps can be reduced, thus resulting in a faster duty cycle between crimps. Larger connectors would require a larger distance $D_{CRIMP}$ 190.

Figure 3:
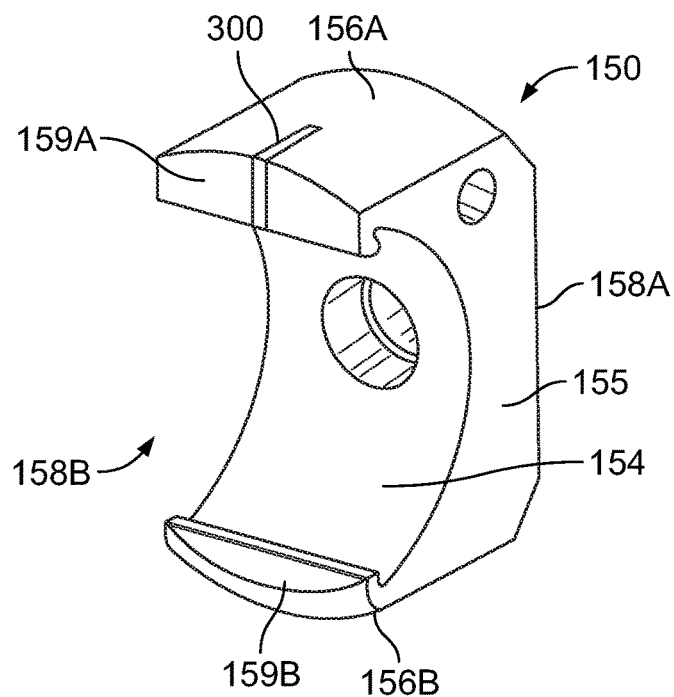
FIG. 3 illustrates a perspective view of a moveable die head that may be used with the working head illustrated in FIGS. 1 and 2.
Figure 4:
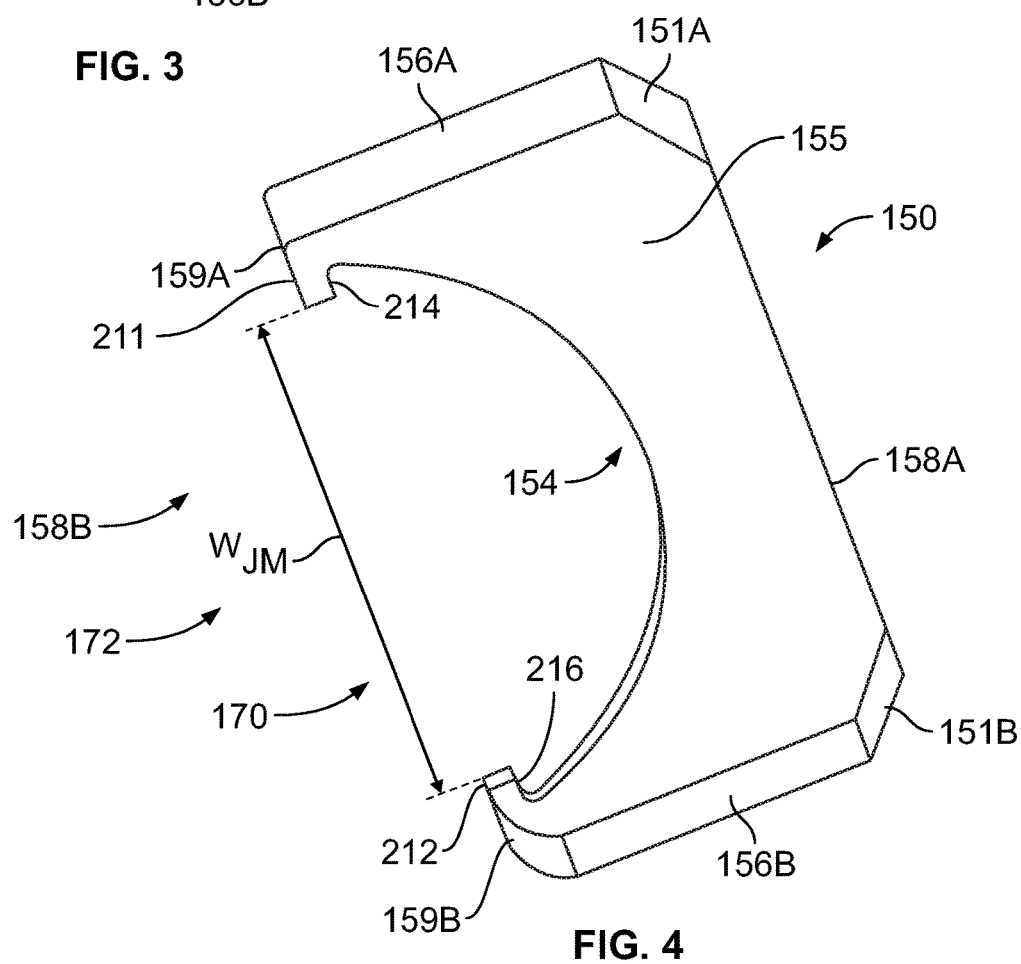
FIG. 4 illustrates a side view of the moveable die head illustrated in FIG. 3.

FIG. 3 illustrates a perspective view of the moveable die head 150 illustrated in FIGS. 1 and 2. FIG. 4 illustrates a side view of the movable die head 150 illustrated in FIG. 3. Referring now to FIGS. 3 and 4, the moveable die head 150 comprises a main body 155 that defines a curved die holder 154 for receiving a movable die, such as the moveable crimp die 200 illustrated in FIGS. 1-2. Preferably, the moveable die head 150 is configured to removably receive a cutting die.

The moveable die head 150 further comprises a first or upper surface 156 A and a second or lower surface 156 B. These first and second surfaces 156 A, B extend from a proximal end 158A of the moveable die head 150 towards a distal end 158B of the moveable die head 150. The distal end 158B of the moveable die head 150 further defines a first end face and a second end face 159 A, B that extend vertically along the main body 155 of the moveable die 150.

In this illustrated arrangement, an alignment feature 300 may be provided along the first end face 159A of moveable die head 150. As just one example, the alignment feature 300 may be configured as a straight, continuous line of constant width. However, other alternative alignment features may also be used such as dashed lines, dashes, and/or non-uniform lines, for example.

In one preferred arrangement, the alignment feature 300 extends along the entire length of end face 159A of the moveable die head 150. In one preferred arrangement, the alignment feature 300 also extends along a first portion of the first or upper surface 156A of the moveable die head 150. In one preferred arrangement, the alignment feature 300 comprises a small groove that is machined, milled, engraved, and/or laser etched into an outer surface of the moveable die head 150, such as the first end face 159A and the first surface 156A. Alternatively, the alignment feature may be painted, colored, and/or coated along such surfaces. In yet another arrangement, the alignment feature may comprise one or more labels and/or stickers that is glued by way of an adhesive to an outer surface of the moveable die head.

An alignment feature 300 may also be provided along the outer surface of the second end face 159B and/or the second surface 156B. Additionally, an alignment feature may be provided along the curved die holder 154 and/or also along a first portion 151A and/or a second portion 151B of the moveable die head 150. As will be explained in greater detail with respect to FIG. 8, the alignment feature 300 of the moveable die head 150 provides a user of the working head 22 with a mechanism for properly aligning the working head 22 with a desired crimp or cut location on a crimp target (e.g., a connector) or a cut target (e.g., a electrical cable) prior to crimp.

Figure 5:
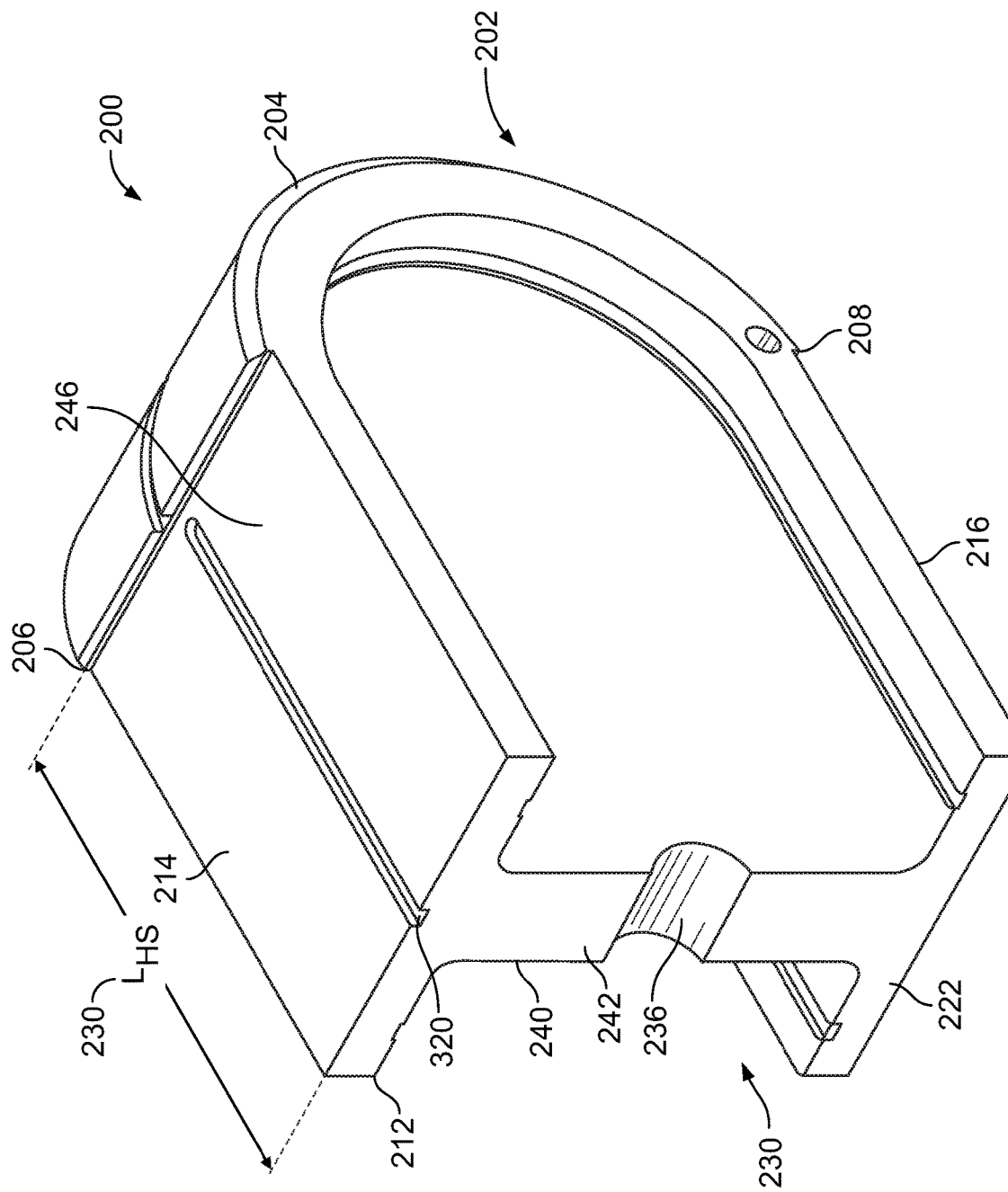
FIG. 5 illustrates a perspective view of a movable die that may be used with the moveable die head illustrated in FIGS. 1 and 2.
Figure 6:
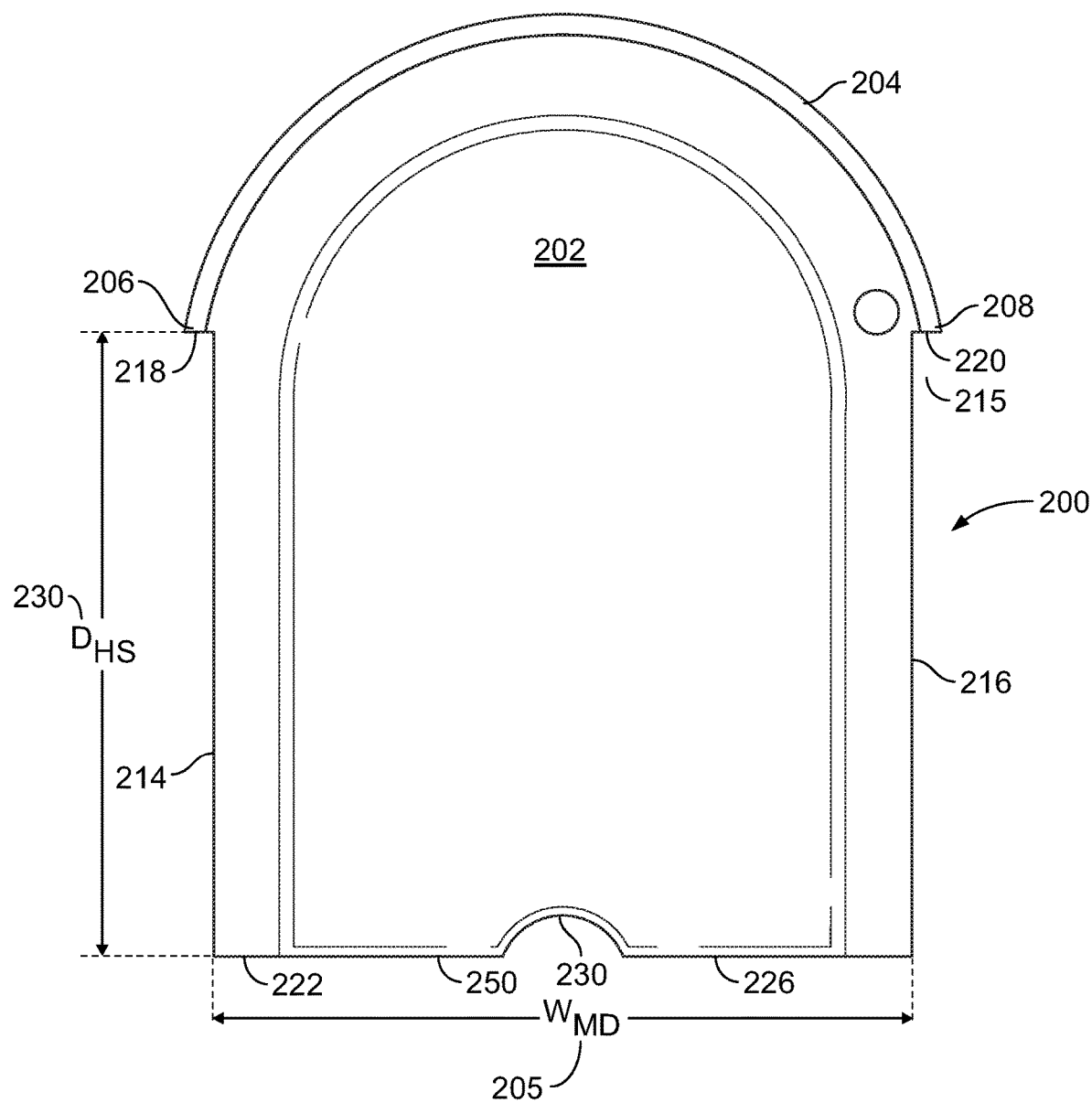
FIG. 6 illustrates another perspective view of the moveable die illustrated in FIG. 5.

FIG. 5 illustrates a perspective view of the moveable die 200 illustrated in FIGS. 1 and 2. FIG. 6 illustrates another perspective view of the moveable die 200 illustrated in FIGS. 1 and 2. Referring to FIGS. 5-6, the moveable die 200 comprises a curved main body portion 202 having a curved outer surface 204. This curved main body portion 202 is configured to allow the moveable die 200 to be removably seated within the moveable die head 150 which is operably coupled to the ram assembly 100. Extending from a first portion 206 of the curved main body portion 202 of the moveable die is a first horizontal surface 214. Similarly, extending from a second portion 208 of the curved main body portion 202 is a second horizontal surface 216. In this illustrated arrangement, the first and second horizontal surfaces 214, 216 extend a distance away from the curved main body portion 202. In this preferred arrangement, the first and second horizontal surfaces 214, 216 extend a same distance or length $L_{HS}$ 232 away from the curved main body portion 204. This length $L_{HS}$ 230 is similar to the length $L_{MCD}$ 210 illustrated in FIG. 2 and discussed herein.

The moveable die 200 further comprises a vertically extending die plate 240 that is positioned between the first horizontal surface 214 and the second horizontal surface 216. As such, in this illustrated arrangement, the first horizontal surface 214, the second horizontal surface 216, and the vertically extending die plate 240 together define an I beam structure.

A distal end 212 of the first horizontal surface 214, a distal end 222 of the second horizontal surface 216, and a distal end 242 of the vertical die plate 240 lie in a same plane and together define the moveable crimp die face 230 of the moveable crimp die 200 (see also FIG. 2). Furthermore, the moveable crimp die face 230 may define a crimp groove 236. In one preferred arrangement, the working head 22 may be configured to utilize a plurality of different moveable dies wherein each of the moveable dies define a plurality of different crimp grooves, each different crimp groove comprising a different shape, size, and/or geometry, such as, a different radius of curvature.

In the arrangement illustrated in FIGS. 1 and 2, a size of the crimp groove 280 of the stationary crimp die 250 is similar to a size of the crimp groove 236 of the moveable crimp die 200. In alternative arrangements, such crimp grooves 280, 236 may comprise dissimilar crimp grooves. As those of ordinary skill in the art will recognize, the size of the crimp groove 236, 280 (and hence the type of crimp set 55 utilized by the crimping head 22) may be selected based upon the size of the connector or wires being crimped.

Referring to FIG. 5, an alignment feature 320 is provided along an outer surface 246 of the first horizontal surface 214. In one preferred arrangement, the alignment feature 320 extends along the entire length $L_{HS}$ 230 of the first horizontal surface 214, to where the first horizontal surface 214 meets the curved main body 202. In one preferred arrangement, the alignment feature 320 may comprise a uniform groove that is machined into or laser etched along the outer surface 246 of the first horizontal surface 214. Alternative arrangements may comprise a non-uniform groove.

An alignment feature 320 may be provided along an outer surface of the second horizontal surface 216. In yet another arrangement, an alignment feature may be provided along at least a portion of the I beam structure of the moveable die 200. For example, an alignment feature may be provided along at least a portion of the vertical plate 240 of the moveable die 200. Alternatively or in addition to other alignment features, an alignment feature may be provided along at least a portion of the crimp groove 236 of the moveable die 200. Similar alignment features may be provided on the various surfaces of the stationary die 250 as well.

As will be explained in greater detail with respect to FIG. 8, the alignment feature 320 of the moveable crimp die 200 can provide a user of the working head 22 with a mechanism for aligning the crimping head 22 with a desired crimp location provided on a crimp target (e.g., a connector) prior to crimp.

Reference is now made to FIGS. 4 and 6 to describe how the moveable crimp die 200 is configured to be seated within the moveable die head 150. As those or ordinary skill in the art will recognize, the second or stationary die 250 may be similarly configured so as to be seated within the second die head.

As illustrated, the moveable die head 150 comprises a jaw mouth 170 that is generally circular in design defining a jaw mouth width $W_{JM}$ 172. This jaw mouth 170 comprises a first edge 211 and second edge 212 and these edges comprise a first and a second curved edge or lip portion 214, 216, respectively. This configuration allows for the moveable crimp die 200 to be seated within these two curved edges or lip portions 211, 212 wherein the moveable crimp die 200 has a width $W_{MCD}$ 205 that is generally equivalent to the jaw mouth width $W_{JM}$ 172.

As can be seen from FIG. 6, the moveable crimp die 200 is generally semi-circular in nature and is provided with a first notch 218 at a first end 206 of the semi-circular die and a second notch 220 provided at the other or second end 208 of the semi-circular die. These two notches 218, 220 are configured to allow the moveable crimp die 200 to be slid into the jaw mouth 170 (FIG. 4) so that the first and the second lip portions 214, 216 of the jaw mouth 170 prevent the die 200 from dropping out of the jaw mouth. Once the die 200 is slid into a desired position as illustrated in FIGS. 1 and 2, a release pin configuration may be used to further secure the die in position.

Figure 8:
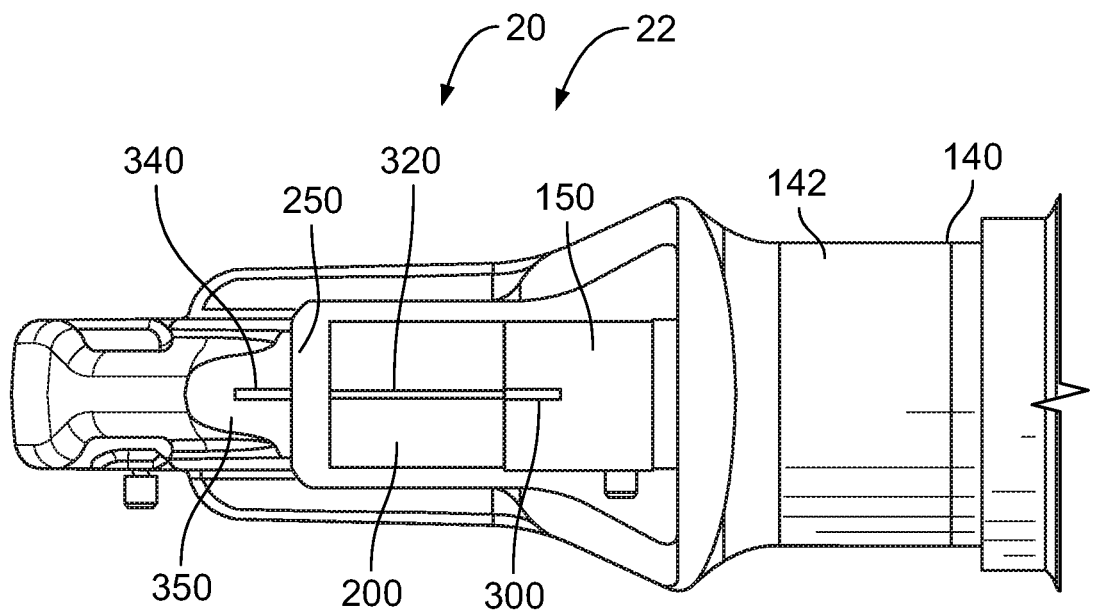
FIG. 8 illustrates another perspective view of the working head illustrated in FIGS. 1 and 2.

FIG. 8 illustrates a perspective view of the crimper head 22 illustrated in FIGS. 1 and 2. Specifically, FIG. 8 illustrates a top view of the crimper head 22 illustrated in FIGS. 1 and 2 with the moveable crimp die 200 being partially driven towards the stationary crimp die 250. As illustrated, the alignment feature 300 of the moveable die head 150 aligns with an alignment feature 320 of the moveable crimp die 200. In addition, the alignment feature 340 of the crimping head 22 also aligns with the alignment feature 320 of the movable crimp die 200.

Figure 7:
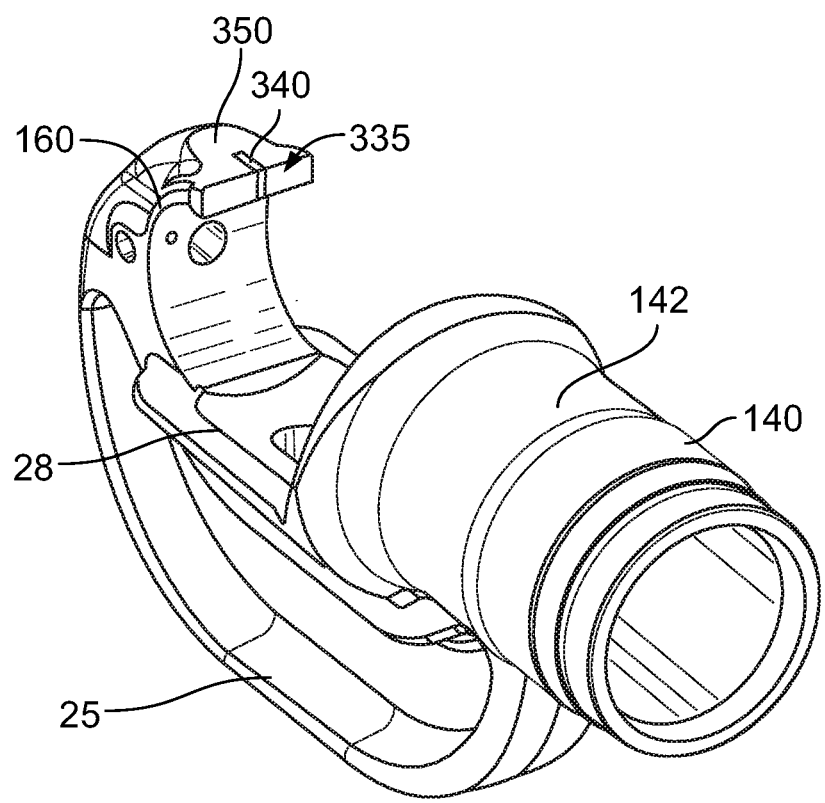
FIG. 7 illustrates a perspective view of the working head illustrated in FIGS. 1 and 2.

FIG. 7 illustrates a perspective view of the crimping head 22 wherein an alignment feature 340 is provided along at least a portion of the crimper die head 160. In this illustrated arrangement, the alignment feature 340 is provided along a first vertical face 335 of the crimping head 22 and extends at least partially along an inclined face 350. As with the other alignment features 300, 320, alignment feature 340 may comprise a small groove that is machined or laser etched into an outer surface of the vertical face 335 and/or the inclined face 350 of the crimper die head 160. In addition, an alignment feature may also be provided along an outer surface 142 of the cylinder 140 of the main tool section 15. For example, an alignment feature may be provided along at least a portion of the outer surface 142 of the cylinder 140 illustrated in FIG. 7. In yet another exemplary arrangement, an alignment feature may be provided along the surface 28 of the frame 25.

Returning to FIG. 8, a user of the crimping head 22 can utilize these alignment features 300, 320, 340 to align a desired crimp location with these alignment features. In the alignment feature arrangement illustrated in FIG. 8, although no alignment features are provide by way of the stationary crimp die 250, alternative alignment feature arrangements may include such an alignment feature.

The description of the different advantageous embodiments has been presented for purposes of illustration and description, and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A working head for a hydraulic power tool operated by a user on a work piece, the working head comprising:
 a head frame;
 a first moveable die head configured to move along the head frame, wherein the first moveable die head is adapted to receive a first moveable die comprising a first body length;
 a second die head coupled to the head frame and adapted to receive a second die comprising a second body;
 a first alignment feature for alignment of a target location indicating a crimp or cut location of the work piece that is positioned between the first moveable die head and the second die head, wherein the first alignment feature is disposed on the first moveable die, wherein the first alignment feature has a first portion that extends longitudinally along a direction of movement of the first moveable die; and
 a second alignment feature positioned on the first moveable die head, the first alignment feature and the second alignment feature forming a continuous line that is visible to the user to help achieve a desired crimp or a desired cut at the target location.

2. The working head of claim 1, wherein the first alignment feature comprises a straight line.

3. The working head of claim 1, wherein the first alignment feature comprises a constant width.

4. The working head of claim 1, wherein the first alignment feature comprises at least one groove.

5. The working head of claim 1, wherein the first alignment feature is provided along a first surface of the first moveable die.

6. The working head of claim 5, wherein the first alignment feature is provided, at least partially, along an end face of the first moveable die.

7. The working head of claim 6, wherein the first moveable die is configured to be seated within the first moveable die head.

8. The working head of claim 1, further comprising a third alignment feature provided along a surface of the second die head.

9. The working head of claim 8, wherein the first alignment feature, the second alignment feature, and the third alignment feature align with each other.

10. The working head of claim 1, wherein the second die comprises a second crimping die.

11. The working head of claim 10, wherein the second crimping die comprises a second crimp groove.

12. The working head of claim 1, wherein the first moveable die comprises a first moveable crimp die.

13. The working head of claim 12, wherein the first moveable crimp die comprises a first crimp groove.

* * * * *